(12) United States Patent
Kim et al.

(10) Patent No.: US 8,825,991 B2
(45) Date of Patent: Sep. 2, 2014

(54) FOTA BASED DATA UPDATE METHOD AND MOBILE TERMINAL SUPPORTING THE SAME

(75) Inventors: Youn Lae Kim, Seoul (KR); Ki Wook Hong, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 280 days.

(21) Appl. No.: 13/399,340

(22) Filed: Feb. 17, 2012

(65) Prior Publication Data
US 2012/0254599 A1 Oct. 4, 2012

(30) Foreign Application Priority Data
Mar. 28, 2011 (KR) ........................ 10-2011-0027384

(51) Int. Cl.
G06F 9/00 (2006.01)
G06F 15/177 (2006.01)
G06F 11/00 (2006.01)
G06F 9/44 (2006.01)
G06F 9/445 (2006.01)

(52) U.S. Cl.
USPC ......... 713/1; 713/2; 709/220; 714/2; 714/6.1; 717/168; 717/174

(58) Field of Classification Search
CPC ............................... G06F 8/665; G06F 9/4401
USPC ........ 713/1, 2; 709/220; 714/2, 6.1; 717/168, 717/174
See application file for complete search history.

(56) References Cited

U.S. PATENT DOCUMENTS

| 6,584,559 B1* | 6/2003 | Huh et al. .......................... 713/2 |
| 6,615,404 B1* | 9/2003 | Garfunkel et al. ............. 717/173 |
| 7,571,456 B1* | 8/2009 | Joo et al. ......................... 725/132 |
| 7,886,141 B2* | 2/2011 | Jan et al. ........................... 713/2 |
| 7,925,877 B2* | 4/2011 | Andrianov ........................ 713/2 |

* cited by examiner

Primary Examiner — Stefan Stoynov
(74) Attorney, Agent, or Firm — Jefferson IP Law, LLP

(57) ABSTRACT

A Firmware Over-The-Air (FOTA) based data update method and a mobile terminal of supporting the same are provided. The FOTA based data update method for a mobile terminal includes loading a pre-boot file stored in a second memory in a pre-boot loading area of a first memory, identifying version information of a first version bootloader file stored in a first bootloader file area and a second version bootloader file stored in a second bootloader file area, loading a newer version bootloader file, corresponding to a new one of the first version bootloader file and the second version bootloader file, in a bootloader loading area of the first memory, loading, upon bootloader file activation, a FOTA engine and activating the FOTA engine, and updating, upon FOTA engine activation, a bootloader file area storing the older version bootloader file on the basis of received boot related data.

16 Claims, 4 Drawing Sheets

FOTA BASED DATA UPDATE METHOD AND MOBILE TERMINAL SUPPORTING THE SAME

PRIORITY

This application claims the benefit under 35 U.S.C. §119 (a) of a Korean patent application filed on Mar. 28, 2011 in the Korean Intellectual Property Office and assigned Serial No. 10-2011-0027384, the entire disclosure of which is hereby incorporated by reference.

BACKGROUND OF THE INVENTION

1. Field of the Invention

The present invention relates to data update. More particularly, the present invention relates to a Firmware Over-The-Air (FOTA) based data update method that enables a mobile terminal to stably update boot related files in a FOTA environment.

2. Description of the Related Art

Because of rapid advances in technology, in contrast to early mobile terminals which support simple functions related to voice calls and short text messages, modern mobile terminals support various functions related to video calls, electronic organizers, and Internet access. In general, if a mobile terminal supports a user function, proper data update is needed to solve problems or resolve inconveniences during usage of the user function.

To fix an error or to install a new function, the user of a mobile terminal may be required to connect to a server providing binary updates via a Personal Computer (PC). However, this process of connecting the mobile terminal to the PC, accessing the server and performing data update may impose a heavy burden on the user. Moreover, most users may not be sufficiently knowledgeable to perform the necessary updates. To solve these problems, terminal manufacturers may adopt Firmware Over-The-Air (FOTA) technology to provide functional upgrade data to mobile terminals.

In FOTA technology, the bootloader has to load the update engine. Hence, it may be impossible to update the bootloader area. Or, although it may be possible to update the bootloader area, if an error occurs in the bootloader area during boot related data update, error recovery may be not possible. As the bootloader is loaded before the update engine in existing FOTA technology, update of boot related data may be not properly performed. Hence, the existing FOTA technology may deliver only user function related data (i.e., data which is unrelated to boot related files).

SUMMARY OF THE INVENTION

Aspects of the present invention are to address at least the above-mentioned problems/or disadvantages and to provide at least the advantages described below. Accordingly, an aspect of the present invention is to provide a Firmware Over-The-Air (FOTA) based data update method that enables a mobile terminal to update boot related data using FOTA technology.

In accordance with an aspect of the present invention, a method of FOTA based data update for a mobile terminal is provided. The method includes loading a pre-boot file stored in a second memory in a pre-boot loading area of a first memory, identifying version information of a first version bootloader file stored in a first bootloader file area and a second version bootloader file stored in a second bootloader file area, loading the newer version bootloader file in a bootloader loading area of the first memory, loading, upon bootloader file activation, a FOTA engine and activating the FOTA engine, and updating, upon FOTA engine activation, a bootloader file area storing the older version bootloader file on the basis of received boot related data.

In accordance with another aspect of the present invention, a mobile terminal supporting FOTA based data update is provided. The terminal includes a first memory including a pre-boot loading area, a bootloader loading area, and a FOTA engine loading area, a second memory including a first bootloader file area to store a first version bootloader file, a second bootloader file area to store a second version bootloader file, and a FOTA engine file area, and a control unit controlling a process of loading, in response to a boot related data update request, a newer version bootloader file in the bootloader loading area of the first memory, and updating, upon FOTA engine activation, a bootloader file area storing an older version bootloader file on the basis of received boot related data.

In accordance with another aspect of the present invention, a method of FOTA based data update for a mobile terminal is provided. The method includes determining a newer version bootloader file and an older version bootloader file based on the respective version information of a first version bootloader file and a second version bootloader file, loading the newer version bootloader file to a bootloader loading area of the first memory, loading, upon bootloader file activation, a FOTA engine, and activating the FOTA engine, and updating, a bootloader file area that stores the older version bootloader file.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the purpose of description, an apparatus supporting video calls is described as an example of a mobile terminal according to an exemplary embodiment of the present invention. However the present invention is not limited thereto. The mobile terminal according to an exemplary embodiment of the present invention is a terminal capable of Firmware Over-The-Air (FOTA) based data update, and may be any information and communication appliance or multimedia appliance, such as a mobile communication terminal supporting video calls (e.g., based on 3G networks), a mobile phone, a wired/wireless phone, a Personal Digital Assistant (PDA), a smart phone, a laptop computer, a personal computer, a Wideband Code Division Multiple Access (WCDMA) terminal, a portable Internet (Wibro) terminal, an International Mobile Telecommunications 2000 (IMT 2000) terminal, a Global System for Mobile communications (GSM)/General Packet Radio Services (GPRS) terminal, a Universal Mobile Telecommunications System (UMTS) terminal, or the like.

Figure 1:
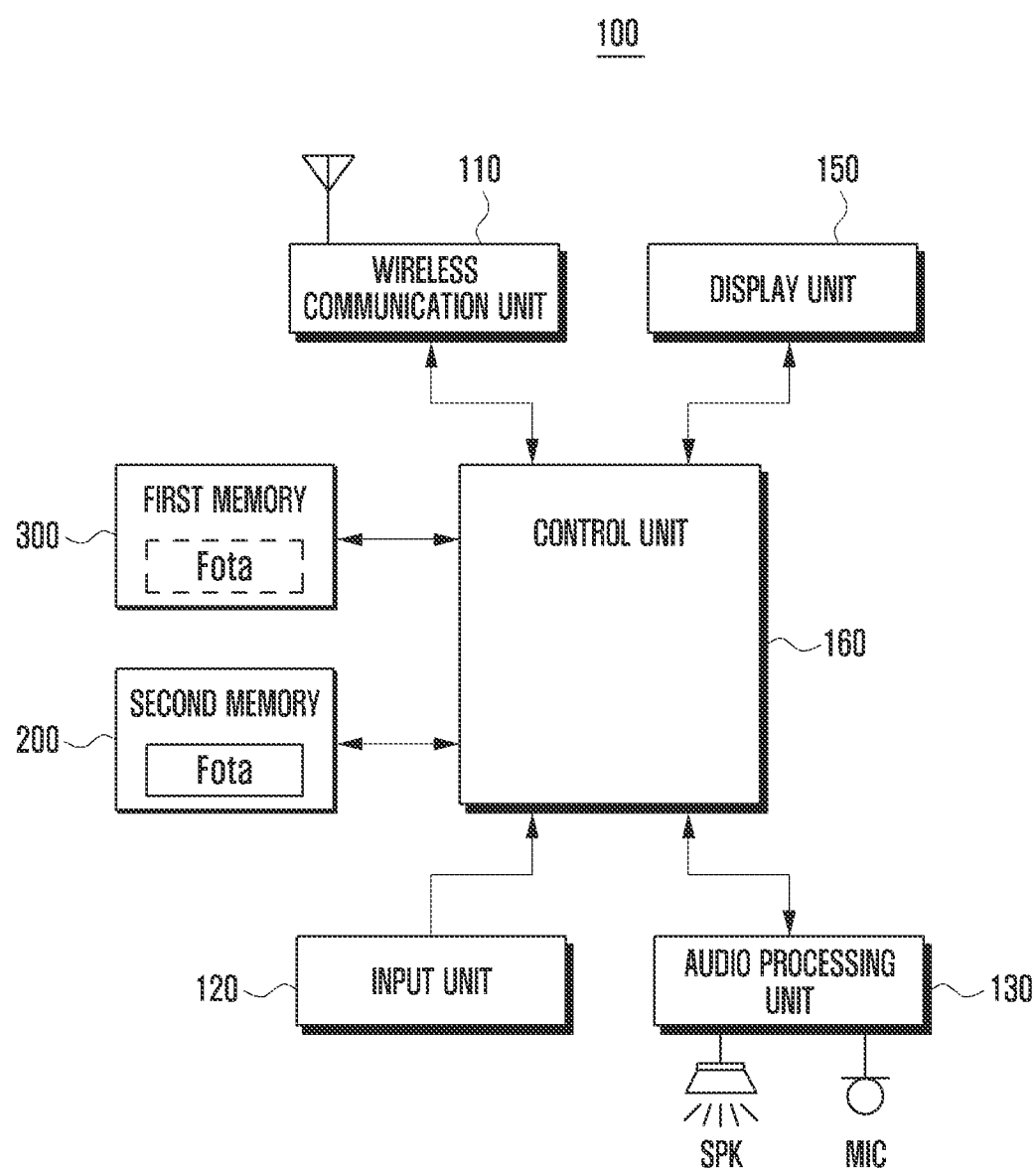
FIG. 1 is a block diagram of a mobile terminal according to an exemplary embodiment of the present invention.

FIG. 1 is a block diagram of a mobile terminal 100 according to an exemplary embodiment of the present invention.

Referring to FIG. 1, the mobile terminal 100 may include a wireless communication unit 110, an input unit 120, an audio processing unit 130, a display unit 140, a first memory 300, a second memory 200, and a control unit 160.

The mobile terminal 100 having the above configuration loads routines, which are stored in the second memory 200, into the first memory 300 to perform an update as to boot related data. As an example, the mobile terminal 100 may perform an update as to boot related data that is received through the wireless communication unit 110. The mobile terminal 100 may allocate a supplementary bootloader area in the second memory 200 and store the boot related data in the supplementary bootloader area. Hence, in the course of FOTA based data update, when received boot related data is present, the mobile terminal 100 may write the received boot related data to the supplementary bootloader area or update data in the supplementary bootloader area with the received boot related data. A description is given of functions of individual components of the mobile terminal 100 with focus on update of boot related data.

The wireless communication unit 110 establishes a communication channel to an external server to receive FOTA based update data therefrom. To achieve this, the wireless communication unit 110 may include a radio frequency transmitter for upconverting the frequency of a signal to be transmitted and amplifying the signal, and a radio frequency receiver for low-noise amplifying a received signal and downconverting the frequency of the received signal. As an example, the update data may include boot related data and function related binary data. The boot related data may be used to update the supplementary bootloader area of the second memory 200, and the function related binary data may be used to update a user function of the mobile terminal 100.

The input unit 120 includes a plurality of alphanumeric and function keys for inputting alphanumeric information and for setting various functions. The function keys may include direction, side, and shortcut keys associated with specific functions. The input unit 120 generates a key signal corresponding to user manipulation for setting and controlling of the operation of the mobile terminal 100, and sends the generated key signal to the control unit 160. As an example, when an attempt for FOTA based data update is made, the input unit 120 may generate an input signal for accepting or rejecting the attempt according to a user action. As another example, when FOTA based data update is performed in the background without requiring user confirmation (e.g., as a background operation about which a user may not necessarily be aware), generation of a confirmation signal may be skipped.

The audio processing unit 130 includes a speaker SPK for outputting audio data (e.g., during a video call), and a microphone MIC for collecting an audio signal (e.g., a voice signal during a video call). In particular, the audio processing unit 130 may output an audible alert indicating FOTA based data update. For example, the audio processing unit 130 may output a first alert indicating establishment of a communication channel to receive FOTA based data, a second alert indicating progress of FOTA based data reception, and a third alert indicating completion of FOTA based data reception. Output of such audible alert may be skipped according to user settings.

The display unit 140 outputs screens associated with various functions of the mobile terminal 100. The display unit 140 may be configured using flat panel display technology based on Liquid Crystal Display (LCD) devices, Organic Light Emitting Diodes (OLED), or the like. If LCD technology is used, then the display unit 140 may include an LCD controller, a storage part to store display data, and an LCD panel. In particular, the display unit 140 may output a screen indicating that the mobile terminal 100 established a FOTA-based communication channel, a screen indicating that the mobile terminal 100 receives update data through the communication channel, a screen indicating that the mobile terminal 100 has completed reception of the update data, and a screen to conduct update using the received update data. If FOTA based data update is performed in the background, output of such a screen may be skipped. In addition, when the update data is applied to a corresponding application program, the display unit 140 may output information regarding changes made to the application program. For example, the display unit 140 may output a list of items replaced by the update data. As an example, the display unit 140 may include a touch panel. If the display unit 140 includes a touch panel and has a touchscreen capability, the display unit 140 may act as an input means.

The first memory 300 provides areas in which various application programs realizing functions of the mobile terminal 100 are loaded under control of the control unit 160. The first memory 300 may be, for example, a random access memory (RAM). The first memory 300 is accessed by the control unit 160, and may temporarily store data used to activate a specific application program. Data stored in the first memory 300 may be removed when a corresponding application program is terminated or when the mobile terminal 100 is turned off As an example, FOTA related data stored in the second memory 200 may be loaded in the first memory 300 under control of the control unit 160. A portion of the FOTA related data may be loaded first and the remaining portions may be loaded in sequence according to actions indicated by the previously loaded data. For example, assume that a pre-boot file, a bootloader file, and a FOTA engine file are loaded in the first memory 300. Under control of the control unit 160, the pre-boot file is loaded first; the bootloader file may be loaded according to activation of the pre-boot file; and the FOTA engine file may be loaded according to activation of the bootloader file. After activation of the FOTA engine, the control unit 160 may store update data received through the wireless communication unit 110 in an area of the second memory 200. Upon rebooting of the mobile terminal 100, the control unit 160 may check presence of received FOTA based update data, and, when update data is present, conduct data update using the received update data as described above.

The second memory 200 may store various application programs realizing functions of the mobile terminal 100, and data generated in the course of using the mobile terminal 100. The second memory 200 may be, for example, a NAND flash memory. The second memory 200 transfers data necessary for activation of a specific application program to the first memory 300 according to a user request or control of the control unit 160. In particular, the second memory 200 stores FOTA related data. More specifically, the second memory 200 may include a pre-boot file area, a first bootloader file area, a second bootloader file area, a FOTA engine file area, and a main binary area for storing data received by the wireless communication unit 110. For example, the second bootloader file area is a supplementary bootloader area, and the stored bootloader file may include a delta space according to a boot related data update scheme. The delta space may be a space reserved for additional data update. The second memory 200 may include a bootloader update data temporary storage area, a first bootloader version storage area, and a second bootloader version storage area. Utilization of individual storage areas of the second memory 200 will be described in detail later with reference to the drawings.

The control unit 160 initializes individual components of the mobile terminal 100 and controls signal flows for updating boot related data based on FOTA technology. In particular, the control unit 160 may control activation of the wireless communication unit 110 and loading of data between the first memory 300 and the second memory 200 to update boot related data based on FOTA technology. More specifically, the control unit 160 may determine whether the bootloader area is storing a newer version bootloader file by comparing version numbers stored in the first and second bootloader version storage areas. The control unit 160 may update the version number stored in a bootloader version storage area corresponding to the bootloader area updated by the boot related data. If the boot related data includes boot delta data for a bootloader file, then the control unit 160 may write the newer version bootloader file to a bootloader area storing the older version bootloader file, and update the newly written newer version bootloader file using the boot delta data. If the boot related data includes a new bootloader file, then the control unit 160 may write the new bootloader file to the bootloader area storing the older version bootloader file. To achieve this, the control unit 160 may be configured as shown in FIG. 2.

Figure 2:
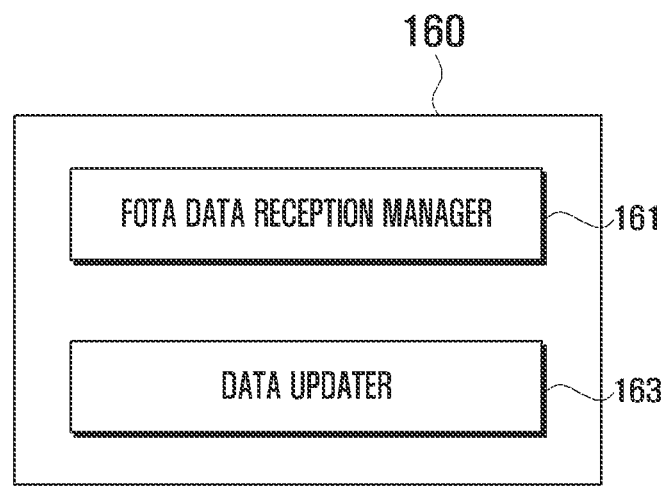
FIG. 2 is a detailed block diagram of a control unit in a mobile terminal such as, for example, the mobile terminal of FIG. 1 according to an exemplary embodiment of the present invention.

FIG. 2 is a detailed block diagram of a control unit of a mobile terminal according to an exemplary embodiment of the present invention.

Referring to FIG. 2, the control unit 160 may include a FOTA data reception manager 161 and a data updater 163.

The FOTA data reception manager 161 may control establishment of a communication channel to a server providing FOTA data according to a request from the server or user. That is, the FOTA data reception manager 161 may activate the wireless communication unit 110 and control an operation to establish a communication channel to the server. When update data is received from the server, the FOTA data reception manager 161 may temporarily store the received update data in the first memory 300 or may directly store the received update data in a given area of the second memory 200. In the event that the update data is temporarily stored in the first memory 300, the control unit 160 thereafter transfers the update data from the first memory 300 to the second memory 200 so as to update FOTA related data stored in the second memory 200 in a FOTA based data update procedure. To be more specific, the FOTA data reception manager 161 may control the wireless communication unit 110 to receive FOTA related update data and store the FOTA related update data according to a request from the server or user. To conduct data update using the received update data, the FOTA data reception manager 161 may load the pre-boot file stored in the second memory 200 in the first memory 300. Upon activation of the pre-boot file, the FOTA data reception manager 161 may load a specific bootloader stored in the second memory 200 in the first memory 300. The FOTA data reception manager 161 may identify the version numbers of first and second bootloader files stored in the second memory 200 and load the newer version bootloader file in the first memory 300. Upon activation of the bootloader file, the FOTA data reception manager 161 may load a FOTA engine file, which is stored in the second memory 200, in the first memory 300.

The data updater 163 conducts data update using the update data received by the FOTA data reception manager 161. Specifically, the data updater 163 may determine whether boot related data is present in the received FOTA related update data, and, when boot related data is present, that data updater 163 may update a bootloader file stored in a bootloader area using the boot related data. The data updater 163 may update an older version bootloader file. The update scheme may differ depending upon content of the boot related data. For example, if the received boot related data includes a complete bootloader file, then the data updater 163 may store the newly received bootloader file in a bootloader area storing the older version bootloader file (e.g., so as to overwrite the older version bootloader file). If the received boot related data includes boot delta data, then the data updater 163 may update the older version bootloader file using the boot delta data. For example, insertion of the boot delta data in the delta space of a bootloader file results in a new version bootloader file. Thereafter, upon activation of the FOTA engine, the data updater 163 may control data update using received regular data (i.e., main binary data).

As described above, the mobile terminal 100 may support bootloader update by performing memory allocation for boot related data and performing boot related data update. In addition, when an error occurs during boot related data update, the mobile terminal 100 may perform error recovery on the basis of the previous version bootloader file.

Hereinabove, individual components of the mobile terminal 100 have been described in relation with boot related data update. Next, a description is given of memory allocation and utilization for boot related data update.

Figure 3:
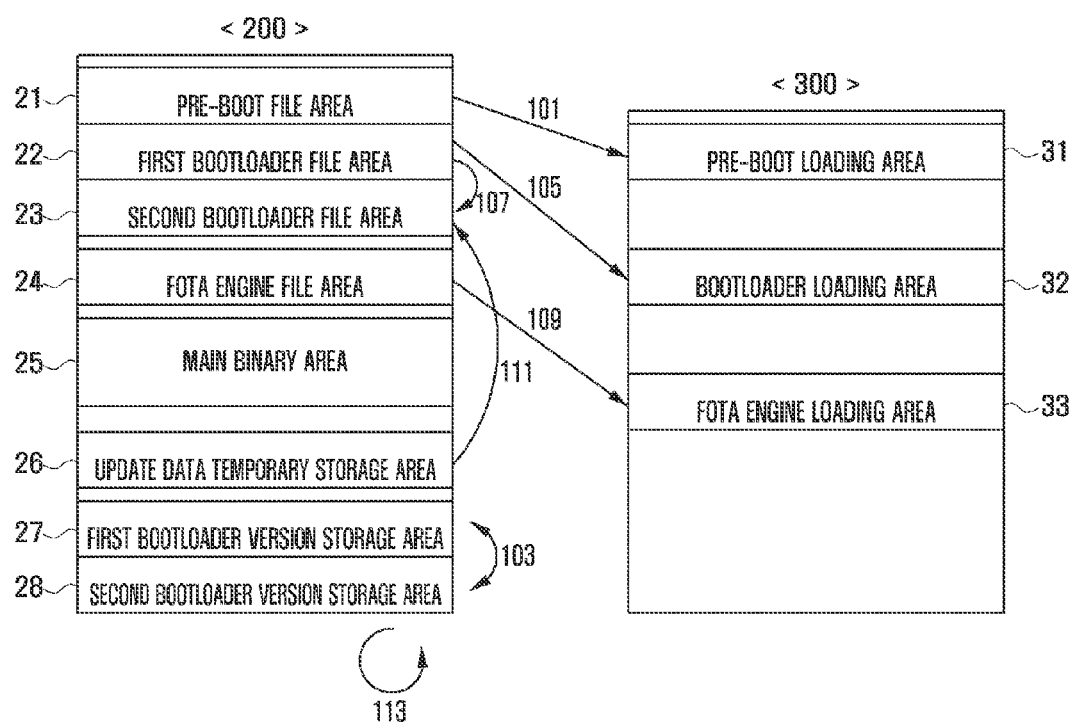
FIG. 3 illustrates data updates using areas of a first memory and a second memory according to an exemplary embodiment of the present invention.

FIG. 3 illustrates a configuration and a utilization of a first memory and a second memory according to an exemplary embodiment of the present invention.

Referring to FIG. 3, the second memory 200 includes a pre-boot file area 21, a first bootloader file area 22, a second bootloader file area 23 and a FOTA engine file area 24. The second memory 200 further includes a main binary area 25 to store data received through the wireless communication unit 110 (e.g., main binary data). The second bootloader file area 23 may include a delta space for data update. The second memory 200 may further include an update data temporary storage area 26, a first bootloader version storage area 27, and a second bootloader version storage area 28. The first bootloader version storage area 27 stores version information indicating the version of a first bootloader stored in the first bootloader file area 22. For example, the version information may indicate the age of the first bootloader stored in the first bootloader file area 22. The second bootloader version storage area 28 stores version information indicating the version of a second bootloader stored in the second bootloader file area 23. Similarly, the version information may indicate the age of the second bootloader stored in the second bootloader file area 23. As these version storage areas store only a small amount of version information, the version storage areas make version identification for the first and second bootloader files easier in comparison to actual access to the areas storing the first and second bootloader files. If separate version storage areas are not allocated according to design, then the control unit 160 may directly access the bootloader file areas to identify the versions of the bootloader files.

The first memory 300 may include a pre-boot loading area 31, a bootloader loading area 32, and a FOTA engine loading area 33. A bootloader file stored in one of the first bootloader file area 22 and the second bootloader file area 23 of the second memory 200 may be loaded in the bootloader loading area 32. For example, the newer version bootloader file may be loaded first.

Next, a data update procedure is described using the allocated areas of the first memory 300 and the second memory 200. The following description focuses on boot related data update.

If data update is requested after update data is received and stored according to a data update request from a server through the wireless communication unit 110 or from the user, then the control unit 160 may control loading of a bootloader file and a FOTA engine file. More specifically, the control unit 160 loads a pre-boot file stored in the pre-boot file area 21 of the second memory 200 in the pre-boot loading area 31 of the first memory 300 as illustrated by step 101. The control unit 160 may activate the pre-boot file loaded in the pre-boot loading area 31.

Upon activation of the pre-boot file, the control unit 160 identifies a newer version bootloader file by examining version information stored in the first bootloader version storage area 27 and the second bootloader version storage area 28 of the second memory 200 at step 103. The first bootloader version storage area 27 may store version and address information of a first bootloader file, and the second bootloader version storage area 28 may store version and address information of a second bootloader file.

The control unit 160 reads the newer version bootloader file from the corresponding bootloader file area and loads the newer version bootloader file in the first memory 300 as illustrated by step 105. For ease of description, the newer version bootloader file is assumed to be a first bootloader file stored in the first bootloader file area 22. Hence, at step 105, the control unit 160 loads the first bootloader file, which is stored in the second memory 200, in the first memory 300.

The control unit 160 stores the first bootloader file in the second bootloader file area 23 as illustrated at step 107. For example, this step is to replace the older version bootloader file with the newer version bootloader file. As an example, the control unit 160 may delete existing data from the second bootloader file area 23 and write the first bootloader file in the second bootloader file area 23. As another example, the control unit 160 may overwrite existing data in the second bootloader file area 23 with the first bootloader file. Writing after deletion may be preferred in consideration of dummy values.

The control unit 160 activates the loaded first bootloader file so as to load a FOTA engine file, which is stored in the second memory 200, on the first memory 300 at step 109. For example, the control unit loads the FOTA engine file, which is stored in the FOTA engine file area 24 of the second memory 200, into the FOTA engine loading area 33 of the first memory 300. The control unit 160 activates the FOTA engine file. After FOTA engine activation, the control unit 160 may conduct data update using update data received from the server through the wireless communication unit 110. For example, the received update data includes boot related data, and the boot related data may contain boot delta data that is to be used for updating the first bootloader file.

When the FOTA engine is activated after reception of boot delta data, the control unit 160 updates the first bootloader file stored in the second bootloader file area 23 of the second memory 200 using the boot delta data at step 111. Hence, the most recent bootloader file can be stored in the second bootloader file area 23. In other words, the bootloader file stored in the second bootloader file area 23 may have a newer version than that stored in the first bootloader file area 22. The boot delta data may be stored in the update data temporary storage area 26 of the second memory 200 and then be transferred to the second bootloader file area 23 for update under control of the control unit 160. In addition, main binary delta data may be received together with the boot related data. The main binary delta data may be used to update the corresponding main binary data. The main binary delta data may be stored in the update data temporary storage area 26 and then be transferred by the FOTA engine to the main binary area 25 for update under control of the control unit 160. Therefore, the main binary data stored in the main binary area 25 may be configured to include a delta space to accommodate main binary delta data.

Thereafter, the control unit 160 updates the version information stored in the second bootloader version storage area 28 at step 113.

At the next round of FOTA based data update, FOTA engine loading is performed on the basis of the second bootloader file stored in the second bootloader file area 23. That is, in response to a data update request, the mobile terminal 100 activates the FOTA engine on the basis of a bootloader file stored in the second bootloader file area 23. Meanwhile, an error may occur during bootloader file update and activation of the FOTA engine based on a bootloader file newly stored in the second bootloader file area 23 may fail. In this case, the mobile terminal 100 may activate the FOTA engine on the basis of a bootloader file stored in the first bootloader file area 22, and report the error to the corresponding server or receive update data from the server to perform bootloader file update using a procedure described above.

Figure 4:
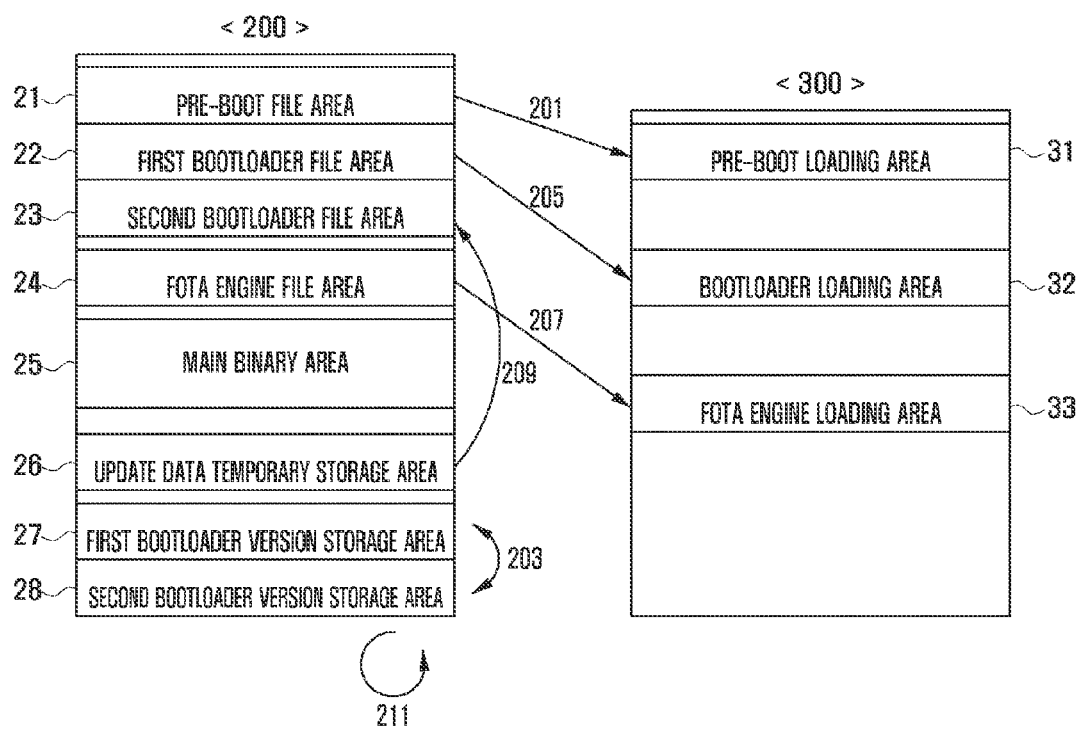
FIG. 4 illustrates data updates using areas of a first memory and a second memory according to an exemplary embodiment of the present invention.

FIG. 4 depicts configuration and utilization of a first memory and a second memory according to an exemplary embodiment of the present invention.

Referring to FIG. 4, similar to the description of FIG. 3, the second memory 200 includes a pre-boot file area 21, a first bootloader file area 22, a second bootloader file area 23, a FOTA engine file area 24, and a main binary area 25. The second memory 200 may further include an update data temporary storage area 26, a first bootloader version storage area 27, and a second bootloader version storage area 28.

In addition, in FIG. 4, similar to the description of FIG. 3, the first memory 300 may include a pre-boot loading area 31, a bootloader loading area 32, and a FOTA engine loading area 33. A bootloader file stored in one of the first bootloader file area 22 and the second bootloader file area 23 of the second memory 200 may be loaded in the bootloader loading area 32. For example, the newer version bootloader file may be loaded first.

A data update procedure is described using the allocated areas of the first memory 300 and the second memory 200. The following description focuses on boot related data update.

When the mobile terminal 100 is rebooted after update data is received and stored according to a data update request from a server through the wireless communication unit 110 or from the user, the control unit 160 controls loading and activation of a pre-boot file for data update at step 201. The control unit 160 identifies a newer version bootloader file by examining version information stored in the first bootloader version storage area 27 and the second bootloader version storage area 28 at step 203. For the following description of FIG. 4, the first bootloader file is assumed to be the newest version. Upon activation of the pre-boot file, the control unit 160 loads the first bootloader file stored in the first bootloader file area 22 in the first memory 300 and activates the first bootloader file at step 205. For example, access to the version storage areas may be skipped according to memory access schemes as described in connection with FIG. 3.

The control unit 160 loads a FOTA engine stored in the second memory 200 on the first memory 300 and activates the loaded FOTA engine to conduct data update using received update data at step 207. The control unit 160 may store the received update data in the update data temporary storage area 26. As an example, the received update data may include all of a new version bootloader file.

The control unit 160 writes the new version bootloader file in the second bootloader file area 23 at step 209. The control unit 160 updates address information stored in the second bootloader version storage area 28 so that the address information for the newest bootloader file indicates the second bootloader file area 23 at step 211.

In the next round of FOTA based data update, the control unit 160 may load a second bootloader file stored in the second bootloader file area 23 in the first memory 300 after examination of bootloader version information, and then activate the FOTA engine on the basis of the second bootloader file.

As described above, the mobile terminal 100 provides a supplementary bootloader file area to store a bootloader file. Hence, when a new version bootloader file or new boot delta data is received, the mobile terminal 100 may perform bootloader file update using the supplementary bootloader file area. According to an exemplary embodiment, the bootloader file may be updated in whole or in part.

As described above, bootloader file update may be performed using new boot delta data or a new bootloader file. Boot delta data or a bootloader file may be mainly used according to server policies, or may be used in combination if necessary. In various exemplary embodiments of the present invention, a supplementary bootloader file area is provided for boot related data update, and boot related data is updated in the supplementary bootloader file area while the current bootloader file is utilized. Here, according to server policies, data update may be performed in whole using new version bootloader data or in part using boot delta data.

Although not shown, the mobile terminal 100 may further include at least one of a short-range communication module for short-range communication, a camera module for capturing still or moving images of a target object, a data communication interface based on wired and wireless communication, an Internet communication module for Internet access, and a digital broadcast receiving module for playing digital broadcasts. With the digital convergence trend, it should be apparent to those skilled in the art that the mobile terminal 100 may further include a unit comparable to the above-described units, and one unit thereof may be removed or replaced with another unit.

The mobile terminal 100 of the present invention may be any device capable of FOTA based data update. For example, the mobile terminal 100 may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smart phone, a laptop computer, a handheld computer, or the like.

In a feature of various exemplary embodiments of the present invention, the FOTA based data update method enables a mobile terminal to properly update boot related data using FOTA technology. Hence, the mobile terminal may update various data using FOTA technology, making it possible to update and upgrade various user functions.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal supporting Firmware Over-The-Air (FOTA) based data update, the mobile terminal comprising:
   a first memory comprising a pre-boot loading area, a bootloader loading area, and a FOTA engine loading area;
   a second memory comprising a first bootloader file area to store a first version bootloader file, a second bootloader file area to store a second version bootloader file, and a FOTA engine file area; and
   a control unit controlling a process of loading, in response to a boot related data update request, a newer version bootloader file corresponding to a newer one of the first version bootloader file and the second version bootloader file, in the bootloader loading area of the first memory, and updating, upon FOTA engine activation, a bootloader file area storing an older version bootloader file, corresponding to an older one of the first version bootloader file and the second version bootloader file, on the basis of received boot related data.

2. The mobile terminal of claim 1, wherein the second memory further comprises:
   a first bootloader version storage area storing version information of a bootloader file stored in the first bootloader file area, and
   a second bootloader version storage area storing version information of the older version bootloader file stored in the second bootloader file area.

3. The mobile terminal of claim 2, wherein the control unit identifies a bootloader file area storing a newer version bootloader file by examining respective version information stored in the first and second bootloader version storage areas.

4. The mobile terminal of claim 2, wherein the control unit updates version information stored in one of the first bootloader version storage area and the second bootloader version storage area corresponding to the bootloader file area updated using the boot related data.

5. The mobile terminal of claim 1, wherein the control unit newly writes, when the boot related data includes boot delta data for updating a portion of the bootloader file, the newer version bootloader file in the bootloader file area storing the older version bootloader file, and then updates the newly written newer version bootloader file using the boot delta data.

6. The mobile terminal of claim 1, wherein the control unit writes, when the boot related data includes a new bootloader file, the new bootloader file in the bootloader file area storing the older version bootloader file.

7. The mobile terminal of claim 1, wherein the second memory further includes an update data temporary storage area for temporarily storing the received boot related data.

8. A method of Firmware Over-The-Air (FOTA) based data update for a mobile terminal, the method comprising:
loading a pre-boot file stored in a second memory in a pre-boot loading area of a first memory;
identifying version information of a first version bootloader file stored in a first bootloader file area and a second version bootloader file stored in a second bootloader file area;
loading a newer version bootloader file, corresponding to a newer one of the first version bootloader file and the second version bootloader file, in a bootloader loading area of the first memory;
loading, upon bootloader file activation, a FOTA engine and activating the FOTA engine; and
updating, upon FOTA engine activation, a bootloader file area corresponding to one of first bootloader file area and the second bootloader file area that stores an older one of the first version bootloader file and the second version bootloader file on the basis of received boot related data.

9. The method of claim 8, further comprising:
storing version information of a bootloader file stored in the first bootloader file area in a first bootloader version storage area; and
storing version information of a bootloader file stored in the second bootloader file area in a second bootloader version storage area.

10. The method of claim 9, wherein the identifying of the version information comprises identifying a bootloader file area storing the newer version bootloader file by examining respective version information stored in the first and second bootloader version storage areas.

11. The method of claim 9, further comprising:
identifying a bootloader file area updated using the boot related data; and
updating version information stored in one of the first bootloader version storage area and the second bootloader version storage area corresponding to the identified updated bootloader file area.

12. The method of claim 8, wherein the updating of the bootloader file area comprises:
newly writing, when the boot related data includes boot delta data for updating a portion of the bootloader file, the newer version bootloader file in the bootloader file area storing the older one of the first version bootloader file and the second version bootloader file; and
updating the newly written newer version bootloader file using the boot delta data.

13. The method of claim 8, wherein the updating of the bootloader file area comprises writing, when the boot related data includes a new bootloader file, the new bootloader file in the bootloader file area storing the older one of the first version bootloader file and the second version bootloader file.

14. The method of claim 8, wherein the updating of the bootloader file area comprises:
temporarily storing the boot related data received upon FOTA engine activation in an update data temporary storage area of the second memory; and
updating the bootloader file area storing the older one of the first version bootloader file and the second version bootloader file on the basis of the boot related data stored in the update data temporary storage area.

15. A method of Firmware Over-The-Air (FOTA) based data update for a mobile terminal, the method comprising:
determining a newer version bootloader file and an older version bootloader file based on the respective version information of a first version bootloader file and a second version bootloader file;
loading the newer version bootloader file to a bootloader loading area of a first memory;
loading, upon bootloader file activation, a FOTA engine and activating the FOTA engine; and
updating, a bootloader file area that stores the older version bootloader file.

16. The method of claim 15, further comprising:
loading a pre-boot file stored in a second memory to a pre-boot loading area of the first memory.

* * * * *